Nov. 11, 1947.  A. MELNICZAK  2,430,522
DOUBLE WORKER DRILL, REAMER, AND COUNTERSINK
Filed June 18, 1945  2 Sheets-Sheet 1

INVENTOR.
ALEX MELNICZAK
BY *Victor J. Evans & Co.*
ATTORNEYS

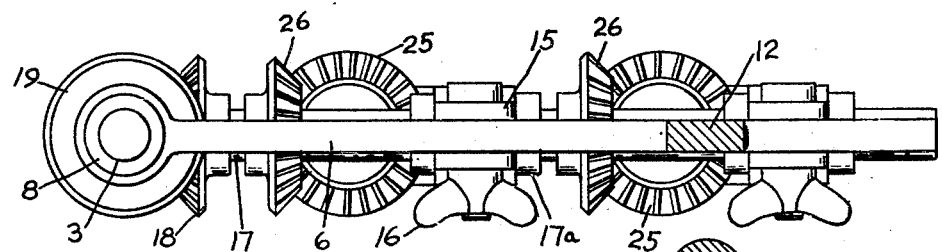
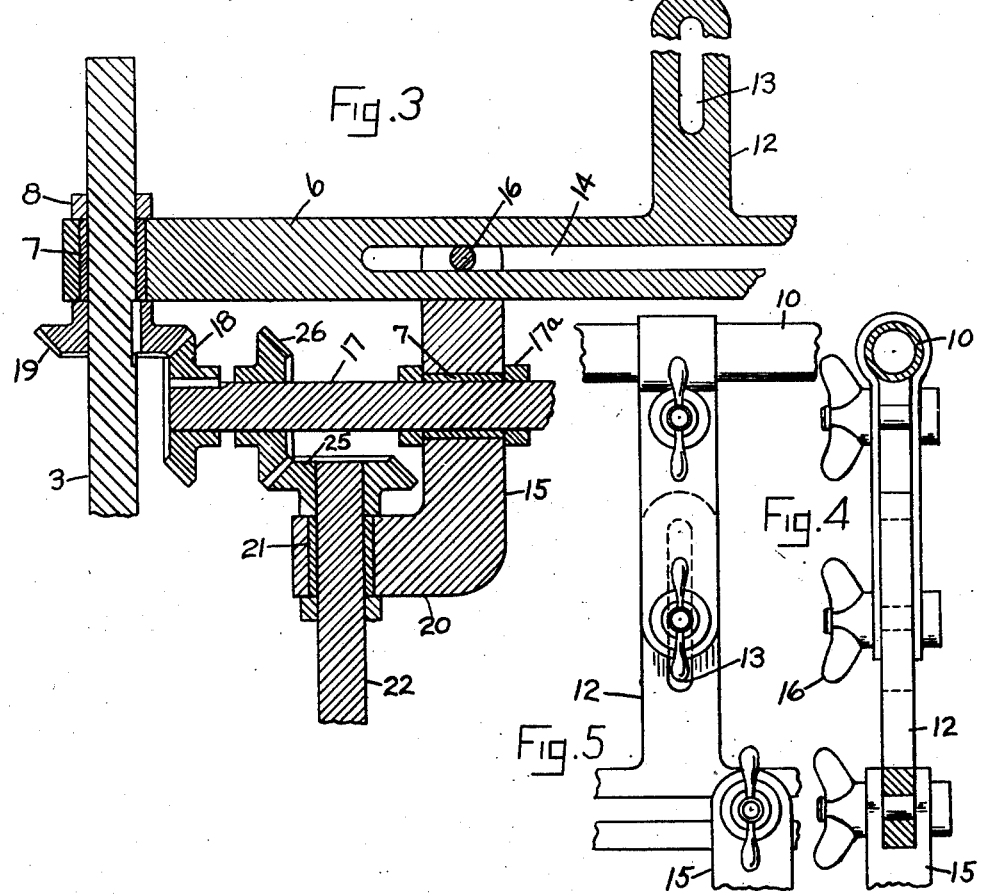

Patented Nov. 11, 1947

2,430,522

UNITED STATES PATENT OFFICE 2,430,522

DOUBLE WORKER DRILL, REAMER, AND COUNTERSINK

Alex Melniczak, Camden, N. J.

Application June 18, 1945, Serial No. 600,050

3 Claims. (Cl. 77—22)

1

My present invention, in its broad aspect, has reference to improvements in gang or multiple drill, or reamer, or countersink attachments for use in metal-working, and is designed to be connected with any electric or air power plant. More particularly, it is my purpose to provide an improved device of this character which has an adjustable supporting frame and drive connections for adjustable drill, reamer, or countersink units, whereby the amount of work which may be done with the same power unit and labor is greatly increased.

Other and equally important objects and advantages of my invention will be apparent from the following description and drawings, but it is pointed out that changes in form, size, shape, construction and arrangement of parts is permissible and within the purview of my broad inventive concept, and the spirit and scope of the appended claims.

In the drawings wherein I have illustrated a preferred form of my invention—

Figure 2 is a top plan view.

Figure 3 is a detail of the drill supporting frame, and

Figure 4 is a section on the line 4—4 of Figure 1.

In the drawings wherein like characters of reference are used to designate like or similar parts—

Figure 1:
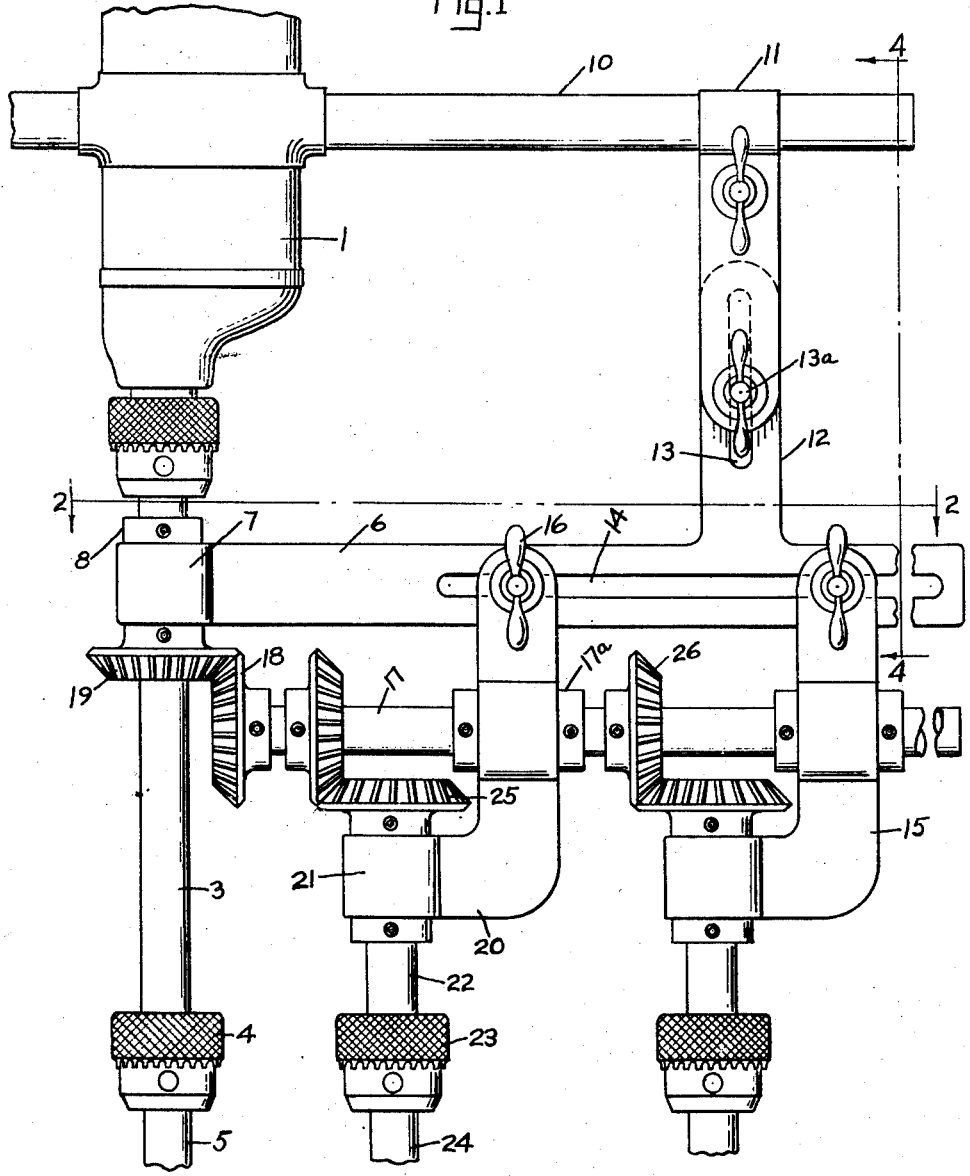
Figure 1 is a side elevation.

The numeral 1 designates a conventional form of electric motor, and a support therefore. The motor 1 has a vertical drive shaft 3 at the end of which is a chuck 4 to receive a drill 5—or a reamer or countersink, if desired.

In carrying out my invention, there is provided a horizontal frame 6 having a sleeve 7 engaging about the motor drive shaft and held in position by upper and lower stop collars 8. A length of supporting pipe 10, or the like, carries the motor support, and is slidably engaged by the collar 11 of the vertical arm 12 of the frame 6. The stop collars 8 are adjustable to position the frame on the shaft and the vertical arm 12 is slotted as at 13 to receive an adjusting screw 13a to engage the collar 11 so that the frame is vertically adjustable with respect to the plane of the motor, and is adjustable to be fed to the work along with the shaft 3 and chuck 4 and drill 5. The frame has an elongated horizontal slot 14. Adjustably mounted on the frame are the vertical L-shaped carriers 15 of additional drills, countersinks or reamers. These carriers have brackets which slidably engage about the frame and each has an adjusting thumb screw 16 which extends

2 through the slot 14. Each carrier has a bore therein, through which extends a shaft 17 provided with adjustable stop collars 17a at the sides of the carriers. The shaft has a pinion 18 meshing with a pinion 19 on the motor drive shaft 3 so that the shaft is driven from the motor drive shaft. Each carrier 15 has a horizontal arm 20 formed with a vertical bearing 21 for a shaft 22 carrying a chuck 23 in which a drill 24 may be mounted, or a countersink or reamer, or other tool. The shaft 17 has a pinion 25 for each shaft 22 keyed thereto and in mesh with a companion pinion 26 on each shaft 22 so that all the drills 24 and 5, or countersinks or reamers, are driven from the motor and are adjustable about the motor and as to relative spacing on the frame. Any reasonable number of separate units, including carriers, shafts, chucks, tools and pinions may be mounted on the frame.

From the foregoing, it is believed that the operation and advantages of my invention will be apparent, but it is again emphasized that interpretation of its scope should only be conclusive when made in the light of the subjoined claims.

I claim:

1. In a drill assembly, the combination, which comprises, a motor housing having a motor therein, said motor having a shaft extending from the housing, a frame having an elongated slot therein and a sleeve at one end perpendicularly disposed in relation to the shaft and extending therefrom, said frame pivotally mounted through the sleeve thereof on the said shaft, L-shaped carriers suspended from said frame with the end of one of the legs thereof adjustably held in the said elongated slot, shaft carrying hubs on the ends of the other legs of the carriers, shafts rotatably mounted in the hubs of the legs of the carriers parallel to the said motor shaft, said shafts carrying tool holding chucks, and means driving the shafts mounted in the carriers from the motor shaft.

2. In a drill assembly, the combination, which comprises, a motor housing having a motor therein, said motor having a shaft extending from the housing, a supporting bar extending perpendicularly from the motor housing, a frame having an elongated slot therein and a sleeve at one end perpendicularly disposed in relation to the shaft and extending therefrom, said frame pivotally mounted through the sleeve thereof on the said shaft and parallel to the said supporting bar, a cross bar connecting the frame to the supporting bar, means adjusting the length of the said cross bar, L-shaped carriers suspended from said frame with the end of one of the legs thereof adjustably held in the said elongated slot, shaft carrying hubs on the ends of the other legs of the carriers, shafts rotatably mounted in the hubs of the legs of the carriers parallel to the said motor shaft, said shafts carrying tool holding chucks, and means driving the shafts mounted in the carriers from the motor shaft.

3. In a gang drill attachment, a motor housing, a motor in said housing, a motor shaft extending from the said housing, a supporting bar extending from the motor housing, a frame having a hub through which it is pivotally mounted on the motor shaft extending from said shaft parallel to the said support bar, means adjustably connecting the frame to the said support bar, L-shaped carriers adjustably mounted on said frame through the ends of the longer legs thereof with shaft carrying hubs on the ends of the shorter legs, shafts rotatably mounted in the hubs of the shorter legs of the carriers, a bevel gear on said motor shaft, a jack shaft parallel to the frame rotatably mounted in the carriers with one end associated with the bevel gear on the motor shaft, a bevel gear on the jack shaft meshing with the bevel gear on the motor shaft, and bevel gears on the shafts of the carriers meshing with bevel gears on the jack shaft providing rotating means of the shafts mounted in the hubs of the carriers.

ALEX MELNICZAK.

REFERENCES CITED

The following references are of record in the file of this patent:

UNITED STATES PATENTS

| Number | Name | Date |
|---|---|---|
| 1,450,121 | Trumbull | Mar. 27, 1923 |
| 1,652,724 | McBee | Dec. 13, 1927 |
| 1,832,111 | George | Nov. 17, 1931 |